June 19, 1934.  J. D. STIRISS  1,963,454
MOVING PICTURE PROJECTOR
Filed Dec. 30, 1932  2 Sheets-Sheet 1
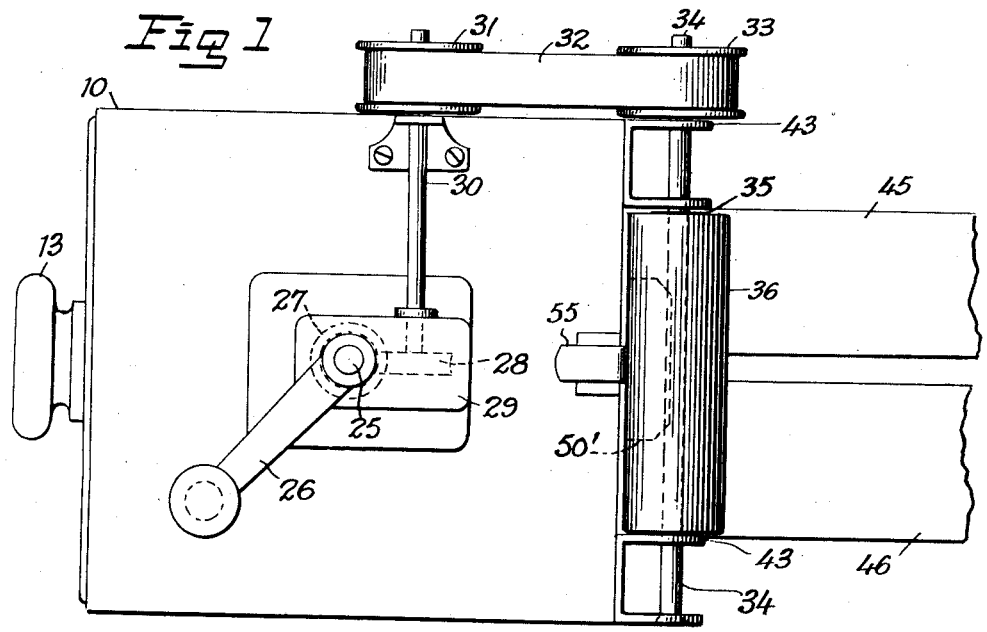
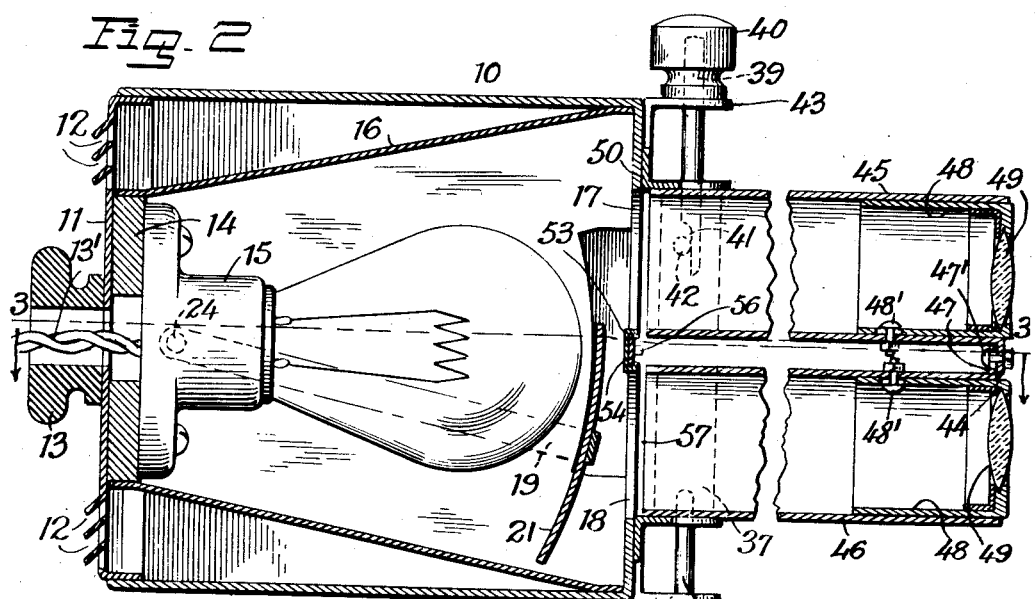
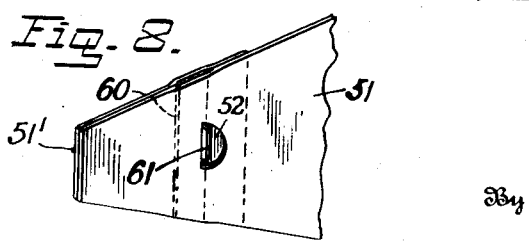
Inventor,
Jacob D. Stiriss,
By James F. Duhamel
Attorney June 19, 1934.  J. D. STIRISS  1,963,454
MOVING PICTURE PROJECTOR
Filed Dec. 30, 1932  2 Sheets-Sheet 2
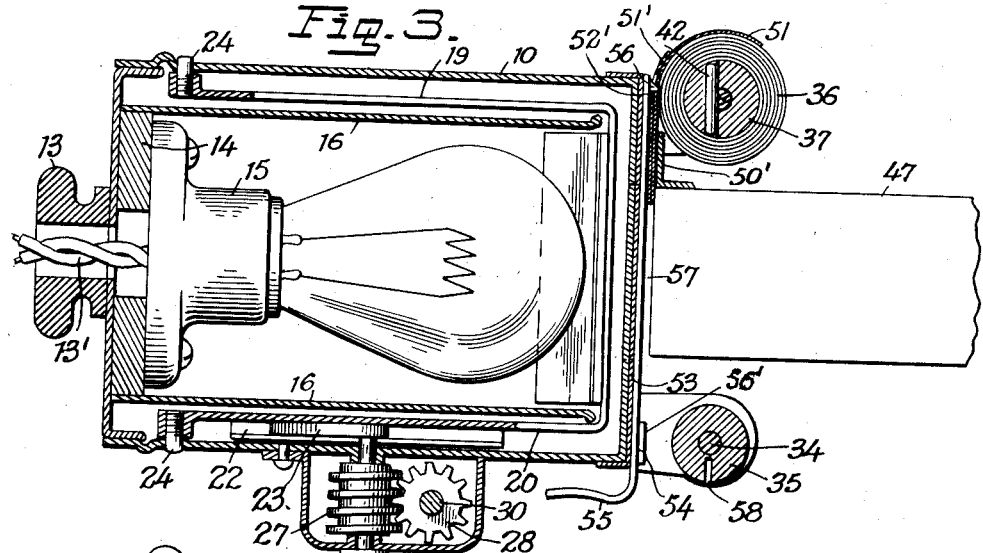
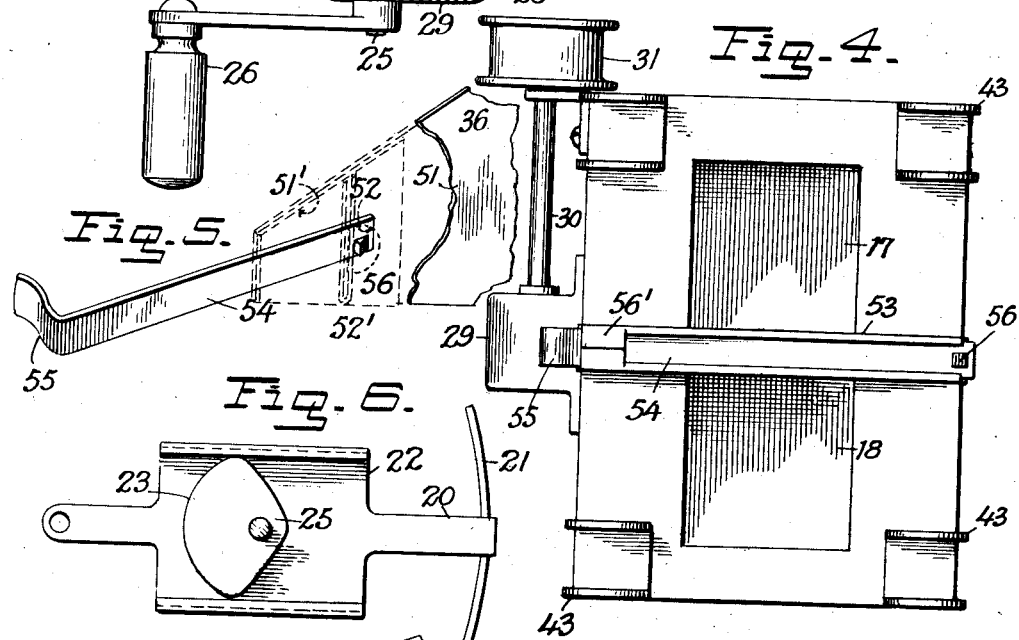
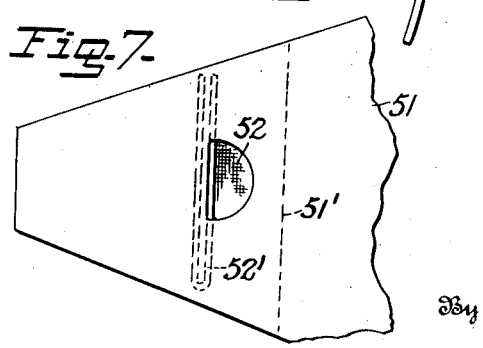
Inventor,
Jacob D. Stiriss,
James P. Duhamel
Attorney Patented June 19, 1934

1,963,454

UNITED STATES PATENT OFFICE 1,963,454

MOVING PICTURE PROJECTOR

Jacob D. Stiriss, New York, N. Y., assignor to Durable Toy Novelty Company, New York, N. Y., a corporation of New York Application December 30, 1932, Serial No. 649,630

5 Claims. (Cl. 88—16.6)

This invention relates to moving picture projectors and more especially to the toy type where cheapness, simplicity and safety are essential and where a film having two rows of subjects is fed before two lenses focused on the same spot.

The objects of the invention are to provide a moving picture projector with means for drawing the film in its initial movement before the lenses and attaching it to the feed roller, means for cooling the lamp box, frictional driving means, telescopic lenses and means for manipulating and operating the device without opening the lamp box.

These and other objects and details of the invention are more fully described in the following specification, set forth in the appended claims and illustrated in the accompanying drawings wherein:

Figure 1 is a side elevation of the improved moving picture projector.

Fig. 2 is a vertical sectional view through the same.

Fig. 3 is a horizontal sectional view through the line 3—3 of Fig. 2.

Fig. 4 is a front view of the lamp box with the lens tubes removed.

Fig. 5 is a perspective view of the draw bar to locate the film.

Fig. 6 is a side view of the shutter showing its operating cam.

Fig. 7 is a detail view of the film tab.

Fig. 8 is a modified form of the film tab.

In the toy moving picture projectors of this type that have been so far put on the market many objections may be raised:

They are bulky in size, making packing, shipping and handling at stores too expensive.

They are wasteful and unpleasant of operation because a plurality of lamps is generally employed requiring much electric current and developing a great deal of heat.

The films being made of thin paper tear readily when obstructed or subjected to much strain by rigid driving means.

To position the film the lamp box must be opened and exposes the child to burning by the lamp or other injury, and the operating means must be released, which is not a safe operation for a child and is a danger to the film.

In toy projectors heretofore made the lenses are necessarily cheap and consequently vary, yet there is no provision for focusing same.

No provision is made to cool the walls of the lamp box.

The present invention is designed to overcome all of these objectionable features and the rectangular lamp box 10 is open at its rear and adapted to receive a door 11 having ventilating openings 12 and a knob 13 of heat insulating material and having a passage through which the electric wiring 13' enters the box.

To the door 10 is secured a block 14 which carries the lamp socket 15 and also a reflecting frame 16 that is adapted to throw the rays from the lamp towards the front of the box. The door 11 is readily removable when it is desired to renew the lamp or make repairs. The reflector frame 16 that also acts as a heat deflector is removed with the door as a unit.

At the front end of the box 10 are two openings 17 and 18 to admit light rays from the lamp towards the film and the lenses and pivoted within the rear of the box is a frame consisting of arms 19 and 20 that carry at their front end the shutter 21 having on its rear face a reflecting surface that throws the light rays back upon the sides of the reflecting frame 16.

The arm 20 carries a flanged rack or slide 22 in which plays a cam 23 that swings the arms on their pivots 24 and causes the shutter 21 to alternately close the openings 17 and 18 to the light rays. The cam 23 is carried at the inner end of a shaft 25 having a crank arm and handle 26 and a worm 27 secured upon it, the said worm and a wheel 28 with which it meshes being enclosed in the housing 29 on the outside of the lamp box 10.

The wheel 28 is secured at the lower end of a vertical shaft 30 that carries at its top a pulley 31 which is connected by the band 32 with a pulley 33 on the shaft 34 of the roller 35, and by the above means movement is imparted to the roller to wind the film thereon.

The film 36 is initially carried by the roller 37 supported on its lower end by a stub shaft 38 (Fig. 2) and at its upper end by a pin 39 with a head 40 and cut away at its lower end as at 41 to engage a crown pin or key 42.

The shafts 34, 38 and the pin 39 are journalled in brackets 43 at the front end of the lamp box and between the lower and upper brackets are located the lens tubes 45 and 46. These tubes are adjustably connected by a slotted lip 47 on the lower tube being attached to a depending lip 44 from the upper tube by means of a bolt 47'. The lenses 49 are carried by short telescopic tubes 48 and held in adjustment by the bolts 48' passing through slots in the short tubes. This affords ready means for a universal adjustment of the light fields so the two may occupy the same area.

The tubes 45 and 46 carry at their rear ends the angle plates 50 to secure them to the lamp box and at their side is an angle plate 50' that, as will be seen in Fig. 3, acts as a guide for the film as it passes before the lamp.

In Figs. 3, 5 and 7 the construction of the front end of the film or tab is shown and wherein an opening 52 is made in the said tab and a reinforcing piece 51' is added to its end. Both the tab and the reinforcing piece are of flexible material and between them is enclosed a wire pin 52' of U-shape, one end of same being exposed at the side of the opening 52.

At the front of the lamp box is a guideway 53 in which operates a catch bar 54 having at one end a handle 55 and at the other end a tooth or hook 56 which is shown in Fig. 3 as in the act of engaging the pin 52' to draw the tab 51 and the film forward and across the front of the lamp box. When drawn out a sufficient distance to deliver the tab, the tooth 56 will engage the stop 56' on the guideway.

To re-wind the film on the roller 37 the head 40 is used and the roller 35 will be ready for the tab of a new film.

The catch bar in Fig. 3 is not at its extreme inward position but is shown moved slightly outward.

In case of any obstruction or impediment to the movement of the film the band 32 will slip upon the pulleys without endangering the film, and when it is desired to insert a new film roller, the pin 39 is removed and the roller is tilted sideways and then lifted from the stub 38.

By the arrangement of the ventilators and the reflecting frame 16 the lamp box is kept fairly cool and to further ensure a low temperature to the outside of the box the said frame and the box itself may be made of some poor heat conductor like vulcanized fiber.

It will be seen that all of the operable parts are on the outside of the box and are accessible and substantial, and it is obvious that the parts may be otherwise arranged and modified in detail without departing from the essential features above described and as set forth in the appended claims.

When removing the lamp case the cam 23 will readily be released from the rack or slide 22.

Instead of the wire member 52', a strip of thin metal 60, as shown in Fig. 8 and enclosed between the tab and the reinforcing piece, may be used and with the edge at the opening 52 turned up to form a lip 61 to be engaged by the catch bar, for the purpose above stated.

What I claim as new is:

1. In moving picture projectors, the combination of a lamp box having front openings, lenses in front of the openings, rollers for a film at the sides of the lenses, and engaging means for the film on the front of the lamp box and adapted to catch the end of said film and draw it across the openings.

2. In moving picture projectors, the combination of a lamp box having openings in its front, lenses in line with the openings, film carrying rollers at the sides of the lenses, and a slide located in the front of the said lamp box and having engaging means for said film and to draw same from one roller to the other.

3. In moving picture projectors, the combination of a lamp box having openings in its front, lenses outside of the box and in line with the openings, a guide attached to the front of the box and between the openings, a roller for a film at each side of the lenses, and a catch bar operating in the guide and having a tooth adapted to engage the end of the film and draw it from one roller to the other.

4. In moving picture projectors, the combination of a lamp box having front openings, lenses in front of the openings, a film carrying roller at one side of the lenses, a removable pivot pin securing the roller in its bearings, a winding roller at the opposite side of the lenses and having securing means for the end of the film, means for rotating the winding roller, a guide on the front of the said box, and a sliding catch rod in the guide and adapted to engage a perforation in the end of the film to draw it from the carrying roller across the openings in the box.

5. In moving picture projectors, the combination of a lamp box having front openings, lenses at the front of the openings, a film carrying roller at one side of the lenses, a winding roller at the other side of the lenses and having a slot to secure the free end of the film, means for rotating the winding roller, a film having a perforated tab, and a catch bar sliding in the front of the lamp box and having a tooth to engage the perforation in the tab and to draw the film across the front openings of the lamp box for engagement with the winding roller.

JACOB D. STIRISS.